(12) United States Patent
Schnaidt et al.

(10) Patent No.: US 11,505,032 B2
(45) Date of Patent: Nov. 22, 2022

(54) MODULAR ARCHITECTURE HVAC FOR MULTI-ZONE APPLICATIONS

(71) Applicant: Hanon Systems, Daejeon (KR)

(72) Inventors: Wayne Schnaidt, Novi, MI (US); Jayanthi R. Iyer, Northville, MI (US); Dennis Vermette, Westland, MI (US)

(73) Assignee: HANON SYSTEMS, Daejeon (KR)

( * ) Notice: Subject to any disclaimer, the term of this patent is extended or adjusted under 35 U.S.C. 154(b) by 244 days.

(21) Appl. No.: 16/912,888

(22) Filed: Jun. 26, 2020

(65) Prior Publication Data

US 2021/0001685 A1 Jan. 7, 2021

Related U.S. Application Data (60) Provisional application No. 62/870,889, filed on Jul. 5, 2019.

(51) Int. Cl.
*B60H 1/00* (2006.01)

(52) U.S. Cl.
CPC ..... *B60H 1/00542* (2013.01); *B60H 1/00064* (2013.01); *B60H 1/00671* (2013.01); *B60H 2001/002* (2013.01); *B60H 2001/0015* (2013.01); *B60H 2001/00085* (2013.01); *B60H 2001/00092* (2013.01); *B60H 2001/00192* (2013.01); *B60H 2001/00714* (2013.01)

(58) Field of Classification Search
CPC .......... B60H 1/00542; B60H 2001/007; B60H 1/00064; B60H 2001/00085; B60H 2001/00192; B60H 2001/002; B60H 2001/0015

USPC .................................................. 454/69–165
See application file for complete search history.

(56) References Cited

U.S. PATENT DOCUMENTS

| | | | | |
|---|---|---|---|---|
| 5,364,159 A | * | 11/1994 | Kelman | B60K 37/00 296/192 |
| 6,206,092 B1 | * | 3/2001 | Beck | B60H 1/00064 165/203 |
| 8,113,229 B2 | * | 2/2012 | Bosma | B60H 1/3421 137/353 |
| 8,950,467 B2 | * | 2/2015 | Lee | B60N 2/5628 165/203 |
| 2003/0157877 A1 | * | 8/2003 | Butera | B60H 1/00028 454/121 |
| 2006/0151161 A1 | | 7/2006 | Richter et al. | |
| 2007/0144728 A1 | | 6/2007 | Kinmartin et al. | |
| 2008/0200110 A1 | | 8/2008 | Ghosh et al. | |
| 2015/0336439 A1 | * | 11/2015 | Wang | B60H 1/00064 165/203 |

(Continued)

FOREIGN PATENT DOCUMENTS

| | | | |
|---|---|---|---|
| KR | 20060094142 A | 8/2006 | |
| WO | WO-2019197290 A1 | * 10/2019 | ......... B60H 1/00542 |

*Primary Examiner* — Ko-Wei Lin
(74) *Attorney, Agent, or Firm* — Shumaker, Loop & Kendrick, LLP; James D. Miller (57) ABSTRACT

An air handling system of a vehicle includes a main housing interchangeable between a first configuration and a second configuration. The main housing has a primary portion configured to convey a cold air flow and a warm air flow therethrough. A secondary portion is interchangeable between a first plenum in the first configuration of the main housing and a second plenum in the second configuration of the main housing.

19 Claims, 10 Drawing Sheets

(56) References Cited

U.S. PATENT DOCUMENTS

| | | | | |
|---|---|---|---|---|
| 2016/0152110 A1* | 6/2016 | Kim | ............... | B60H 1/00664 |
| | | | | 165/203 |
| 2018/0326812 A1* | 11/2018 | Ko | ............... | B60H 1/00064 |
| 2019/0344639 A1* | 11/2019 | Benamira | ............... | B60H 1/00871 |
| 2019/0375267 A1* | 12/2019 | Nishimura | ............... | B60H 1/00564 |
| 2020/0180388 A1* | 6/2020 | Kahrs | ............... | B60H 1/247 |
| 2020/0180394 A1* | 6/2020 | Kim | ............... | B60H 1/00564 |
| 2021/0016637 A1* | 1/2021 | Moeckel | ............... | B60H 1/3421 |
| 2021/0031586 A1* | 2/2021 | Lee | ............... | B60H 1/00285 |
| 2021/0197647 A1* | 7/2021 | Lee | ............... | B60H 1/00328 |

\* cited by examiner

MODULAR ARCHITECTURE HVAC FOR MULTI-ZONE APPLICATIONS

CROSS-REFERENCE TO RELATED PATENT APPLICATION

This patent application claims priority to U.S. Provisional Patent Application Ser. No. 62/870,889 filed on Jul. 5, 2019, the entire disclosure of which is hereby incorporated herein by reference.

FIELD

The present technology relates to heating, ventilation, and air conditioning (HVAC) systems, including systems having a modular structure to easily increase or decrease the number of air flow zones for use in vehicles.

INTRODUCTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air handling system. The air handling system conditions air flowing therethrough and distributes the conditioned air throughout the passenger compartment.

The air handling system commonly employs a housing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

It has become increasingly common for such air handling systems to provide a feature wherein the passengers of the motor vehicle can select different temperature settings with respect to two or more different regions or zones within the passenger compartment of the vehicle. For example, many vehicles include independent temperature control for the left and right sides of the passenger compartment, for the front and rear seat zones of the passenger compartment, or for combinations thereof, as desired.

However, the independent temperature control provided to the different zones of the passenger compartment presents many challenges. Specifically, the air handling system must control the temperature of the air passing therethrough with respect to each of the different zones of the passenger controller without requiring additional and independently provided heating or cooling devices within each of the independently provided flow paths leading to each of the different zones. The different paths must accordingly be integrated directly into the structure of the corresponding air handling system.

Certain HVAC system designs can incorporate unique air distribution housings, having different openings depending on the number of zones of the passenger compartment that require control of the temperature of the air flowing to the zones. For example, the HVAC system includes structure for providing temperature controlled air to single/dual zones when only one or two zones require a temperature control of the air as well as tri/quad zones when more than two zones require a temperature control of the air. Depending on the total amount of zones requiring temperature controlled air, variations are formed in the duct work and plastic housing components of the HVAC system. This increases the design and development timing, assembly and manufacturing complexity, program tooling cost, and can increase opportunities for quality defects, in part due to the number of parts that need to be assembled.

Accordingly, there is a need for a modular design and assembly of HVAC components and systems for use with various multi-zone configurations that minimizes manufacturing costs, assembly time, components, and a complexity of the HVAC system.

SUMMARY

In accordance and attuned with instant disclosure, a modular design and assembly of HVAC components and systems for use with various multi-zone configurations that minimizes manufacturing costs, assembly time, components, and a complexity of the HVAC system has surprisingly been discovered.

According to an embodiment of the disclosure, an air handling system of a vehicle includes a main housing interchangeable between a first configuration and a second configuration. The main housing has a primary portion configured to convey a cold air flow and a warm air flow therethrough. A secondary portion is interchangeable between a first plenum in the first configuration of the main housing and a second plenum in the second configuration of the main housing.

According to another embodiment of the disclosure, an air handling system of a vehicle is disclosed. The air handling system includes a primary portion of a main housing configured to convey a cold air flow and a warm air flow therethrough. The primary portion includes a mixing section and a temperature control door controlling an amount of the cold air flow and the warm air flow conveyed to the mixing section. A first plenum is removeably coupled to the primary portion of the main housing. The first plenum is configured to receive air from the mixing section of the primary portion of the main housing. A second plenum is interchangeable with the first plenum for coupling to the primary portion of the main housing. The second plenum is configured for directly receiving the cold air flow and the warm air flow upstream from the mixing section of the primary portion of the main housing.

According to yet another embodiment of the disclosure, a vehicle with an air handling system is disclosed. The vehicle includes a front seat zone and a rear seat zone of a passenger compartment of the vehicle. The front seat zone is divided into a front driver zone and a front passenger zone. The rear seat zone of a passenger compartment of the vehicle is divided into a rear driver zone and a rear passenger zone. A main housing of the air handling system is configured to deliver air to the front seat zone and the rear seat zone of the passenger compartment. A portion of the main housing is removeably interchangeable between a first configuration and a second configuration, wherein a temperature of the air delivered to the rear seat zone is dependent on a temperature of the air delivered to the front seat zone when the main housing is in the first configuration, and wherein the temperature of the air delivered to the rear seat zone is independently controlled from the temperature of the air delivered to the front seat zone when the main housing is in the second configuration.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a modular architecture HVAC systems and components for multi-zone applications that overcome issues with designs that have unique air distribution housings, having different openings for single/dual zone and tri/quad zone that are changed or unique to plastic components used therein. By modularizing portions of the HVAC systems as detailed herein, the present technology can minimize design and development timing, assembly and manufacturing complexity, program tooling cost, and can reduce chances for quality defects by reducing the number of assembly parts.

Figure 1:
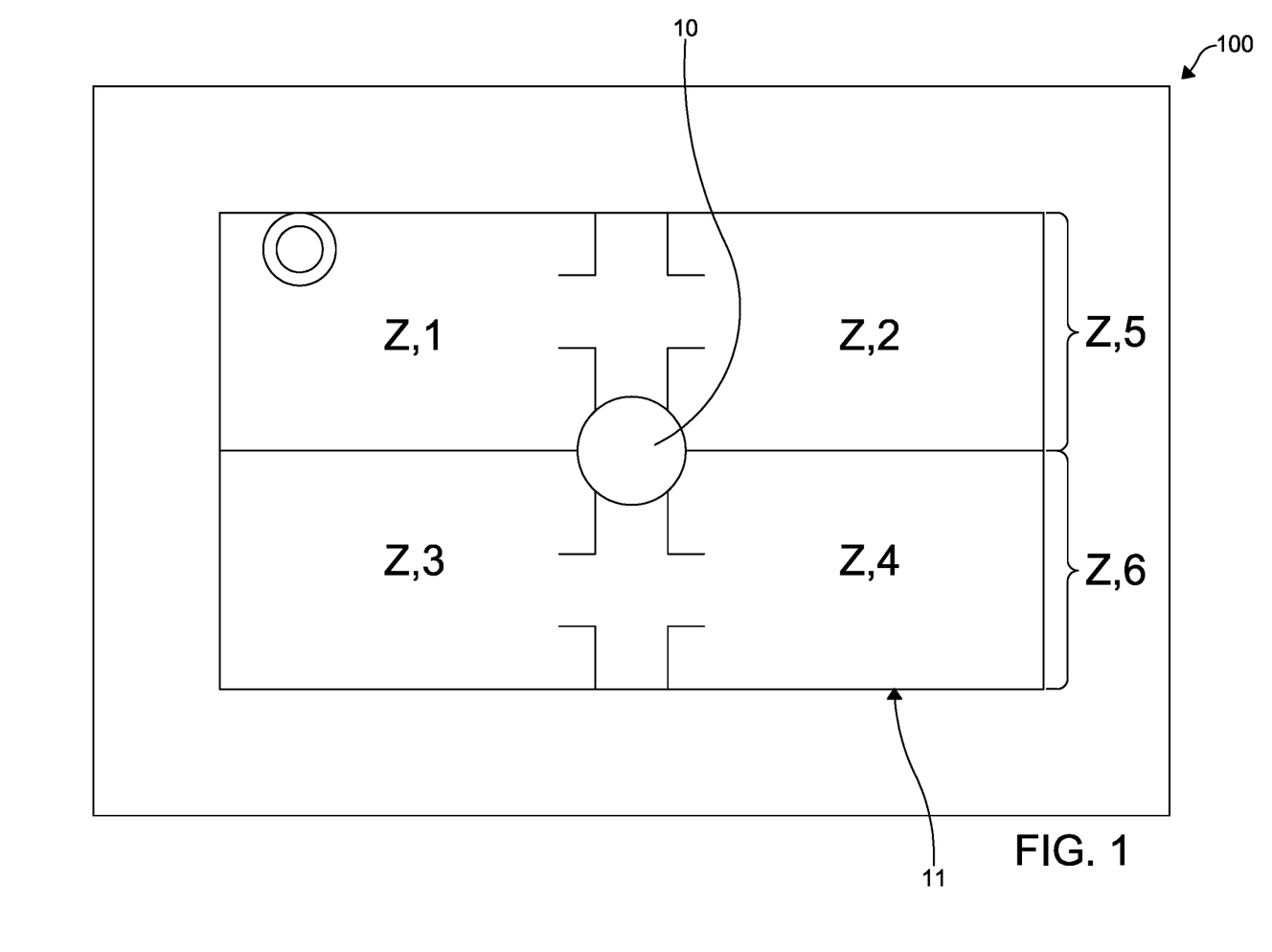
FIG. 1 is a schematic diagram illustrating an air handling system and zones of a passenger compartment of a vehicle according to an embodiment of the instant disclosure.
Figure 2:
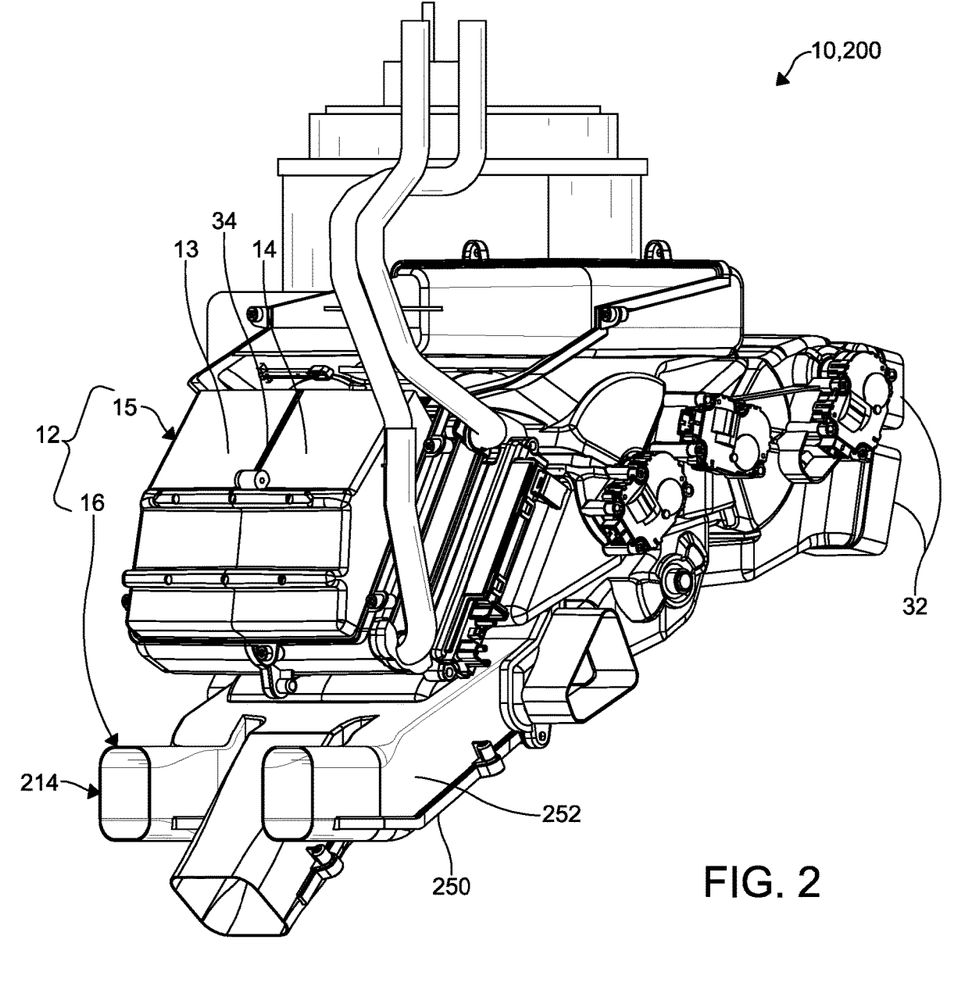
FIG. 2 is a front perspective view of the air handling system of FIG. 1, wherein the air handling system is in a first configuration.
Figure 3:
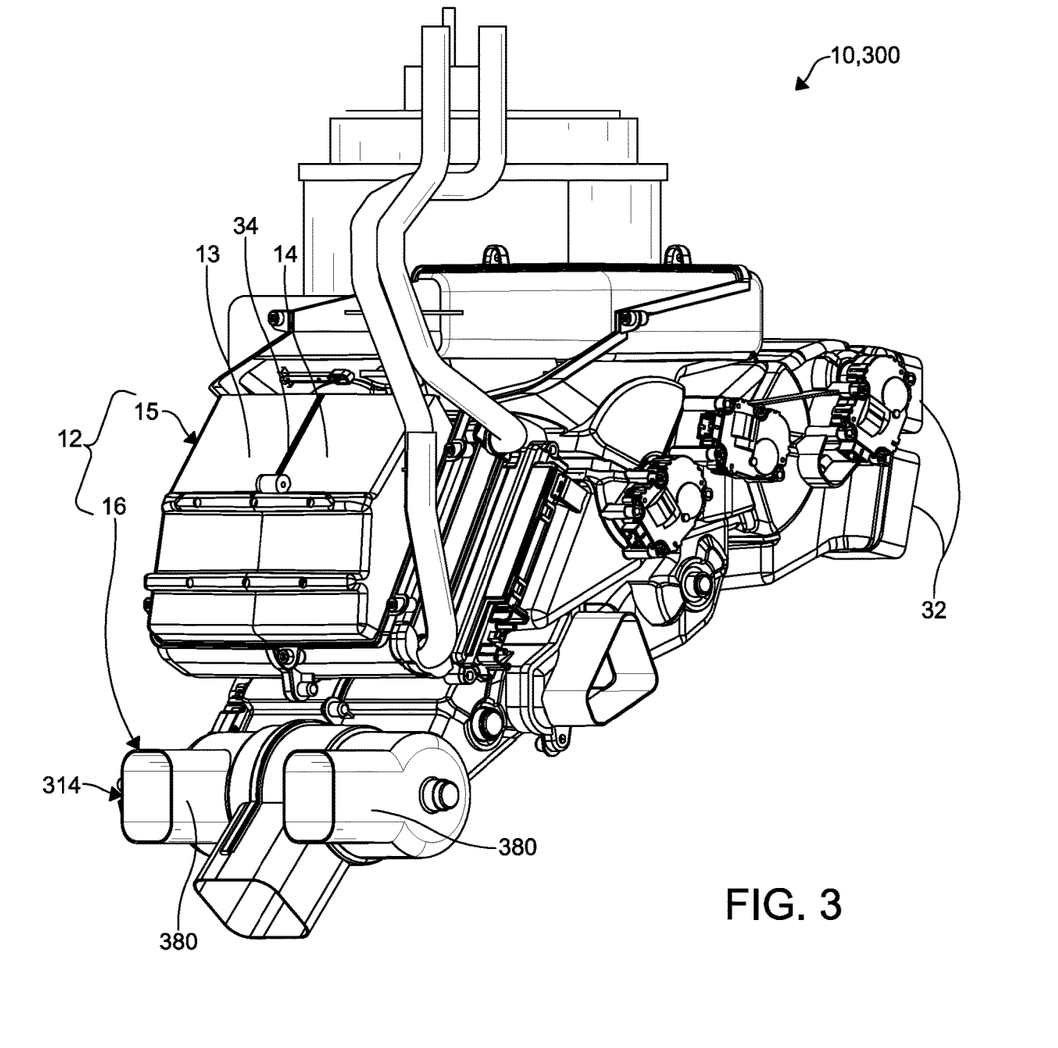
FIG. 3 is a front perspective view of the air handling system of FIG. 2, wherein the air handling system is in a second configuration.

FIG. 1 illustrates an air handing system 10 of a heating, ventilating, and air conditioning (HVAC) system or climate control system for a vehicle 100 according to an embodiment of the present disclosure. The air handling system 10 typically provides heating, ventilation, and air conditioning for a passenger compartment 11 of the vehicle 100. The passenger compartment may be divided into a plurality of different zones Z, herein each of the zones Z also labeled as 1, 2, 3, 4, 5, 6, such as a front seat zone 5 and a rear seat zone 6. The air directed to the front seat zone 5 may be directed through various different vents, including windshield or side window defrost vents, panel vents, or floor vents. Additionally, if desired, the air may be directed to the rear seat zone 6 through various vents. The front seat zone 5 and the rear seat zone 6 may each be further subdivided into left and right zones (i.e. a front driver zone 1, a front passenger zone 2, a rear driver zone 3, and a rear passenger zone 4), as desired. However, it should be understood, the passenger compart 11 of the vehicle 100 can be divided and/or subdivided in any arrangement or manner as desired and may include any number of zones as desired.

The air handling system 10 may accordingly be configured for delivering the air to any single one or combination of the zones Z of the passenger compartment 11 as described hereinafter, and the air handling system 10 may be further configured to provide for independent flow and temperature control of the air with respect to at least two or more of the zones Z. Specifically, the air handling system 10 may be configured to provide at least one of single zone control, dual zone control, tri zone control, or quad zone control. For example, the single zone control includes control of the air flowing to the front seat zone 5, wherein the front driver zone 1 and the front passenger zone 2 are not independently temperature controlled. With the single zone control, air may be provided to the rear seat zone 6. However, the control of the air to the rear seat zone 6 does not include independent temperature control from the front seat zone 5. Therefore, the temperature control of the air to all the zones 1, 2, 3, 4 is the same. The dual zone control is similar to the single zone control but may also include independent temperature control of the air directed to the front driver zone 1 and the front passenger zone 2, wherein temperature control of the rear seat zone 6 depends on the control of the front driver seat zone 1 and the front passenger seat zone 2. The tri zone control may include the front seat zone 5 further divided into the front driver zone 1 and the front passenger zone 2, as desired, wherein each of the three resulting zones 1, 2, 6 is capable of being independently temperature controlled. The quad zone control may further include the division of the rear seat zone 6 into the rear driver zone 3 and the rear passenger zone 4, as desired, wherein each of four distinct zones 1, 2, 3, 4 is capable of being independently temperature controlled. It is understood, other combinations and variations of independent and dependent temperature control can be employed as desired depending on the structure, features, and application of the air handling system 10.

As shown in FIGS. 2-11, the air handling system 10 is interchangeable between a first configuration 200 (as shown in FIGS. 2, 4, 6, 8) and a second configuration 300 (as shown in FIGS. 3, 5, 7, 9). The first configuration 200 is a single/dual mode configuration in which the air handling system 10 is capable of providing the single zone control and the dual zone control. The second configuration 300 is a tri/quad mode configuration in which the air handling system 10 is capable of providing the tri zone control and the quad zone control, if desired. Control of the zones will be described in further detail herein below.

The air handling system 10 includes a main housing 12. The main housing 12 generally includes a primary flow path defined by a primary portion 15 of the main housing 12 and a secondary flow path defined by a secondary portion 16 of the main housing 12. A direction of a flow of air through the primary flow path is indicated by a solid arrow and a direction of the flow of air through the secondary flow path is indicated by a dashed arrow. The primary flow path refers to a flow path through the main housing 12 leading to a primary zone of the vehicle, wherein the primary zone generally refers to the front seat zone 5 having the various vents typically responsible for maintaining the safety and comfort of the driver of the vehicle. The secondary flow path refers to a portion of the main housing 12 branching from select portions of the primary flow path and eventually leading to a secondary zone of the passenger compartment such as the rear seat zone 6. However, the secondary zone may refer to any additional zone of the vehicle, as desired, without departing from the scope of the present invention.

The primary flow path extends through each an inlet section 17, a conditioning section 18, a mixing section 20, and a delivery section 22 of the primary portion 15 of the main housing 12. The inlet section 17 receives a supply of air and may include a blower or fan (not shown) for causing the supply of the air to flow towards the conditioning section 18. The supply of the air can be provided from outside of the vehicle, recirculated from the passenger compartment 11 of the vehicle 100, or a mixture of the two, for example. If desired, a filter (not shown) can be provided upstream or downstream of the inlet section 17 to filter out debris or contaminants carried by the supply of air.

The conditioning section 18 includes an evaporator core 24 and a heater core 26. The evaporator core 24 and the heater core 26 may be in communication with a source of cooled fluid and a source of heated fluid, respectively. The evaporator core 24 may form a portion of a primary refrigerant circuit of the air conditioning system associated with the air handling system 10. The evaporator core 24 is configured to exchange heat energy between the air flowing through the main housing 12 and the cooled fluid flowing through the evaporator core 24 to cool and/or dehumidify the air. Although described as an evaporator core 24, it should be understood that any form of cooling device in heat exchange relationship with any device or system of the motor vehicle may be employed for use with the air handling system 10 without departing from the scope of the present invention.

The heater core 26 may form a radiator associated with a coolant circuit used to cool an engine of the motor vehicle. The heater core 26 is further configured to exchange heat energy between the air flowing through the main housing 12 and a coolant circulated through the coolant circuit to heat the air. Alternatively, the heater core 26 may be in heat exchange relationship with a fluid used to cool a battery or other heat producing device associated with the vehicle 100 or the heater core 26 may be a heating device configured to produce heat using an electrical source. It should be understood that any form of heating device suitable for heating a flow of air therethrough may be used in place of the heater core 26 without departing from the scope of the present invention.

The evaporator core 24 is disposed at a downstream end of the inlet section 17 and extends across an entirety of the flow cross-section of the upstream end of the conditioning section 18 to ensure that all air passing through the conditioning section 18 initially flows through the evaporator core 24. The heater core 26 extends laterally between two lateral side walls of the main housing 12, but does not occupy an entirety of the flow cross-section of the conditioning section 18.

The conditioning section 18 generally includes a temperature control door 28 for controlling a distribution of the air through or around the heater core 26 after the air has passed through the evaporator core 24. The temperature control door 28 is generally configured to be adjustable between a first position wherein the air flows exclusively through a primary cold air path, or around the heater core 26, and a second position wherein the air flows exclusively through a primary warm air path, or through the heater core 26. The temperature control door 28 is also adjustable to a plurality of intermediate positions wherein the air is distributed between the primary cold air path and the primary warm air path, or through the heater core 26 and around the heater core 26. The primary cold air path includes the air having passed through the evaporator core 24 bypassing the heater core 26 before reaching the mixing section 20 while the primary warm air path includes the air passing through the heater core 26 before reaching the mixing section 20.

A cold air flow C from the cold air path and a warm air flow W from the warm air path are combined and mixed in the mixing section 20 to achieve a more homogenous temperature of the air before being delivered to the passenger compartment 11. The mixed air is then delivered to the associated vents of the passenger compartment via the delivery section 22, which includes various different mode control doors 30, conduits 32, 33, secondary flow path outlets 36, 38, 40, and vents (not shown) for controlling the flow of the air being delivered to the passenger compartment 11. As mentioned previously, the vents associated with the primary flow path are generally directed towards the various different vents such as defrost, panel, and floor vents disposed in the front seat zone of the vehicle.

Figure 4:
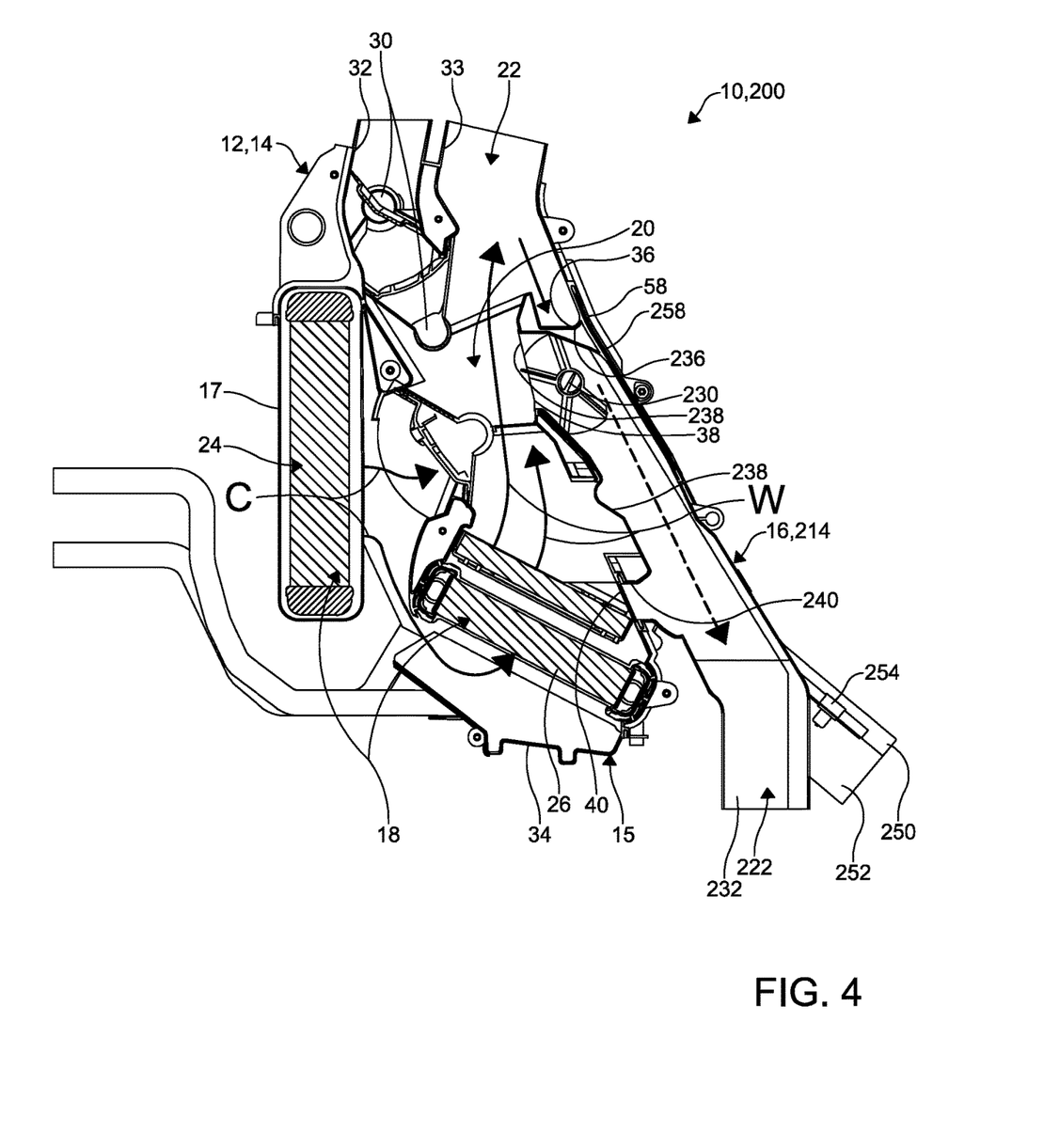
FIG. 4 is a right side elevational cross-sectional view of the air handling system of FIG. 2 taken through a line extending through an interface of a primary housing of the air handling system, wherein the air handling system is in the first configuration.
Figure 5:
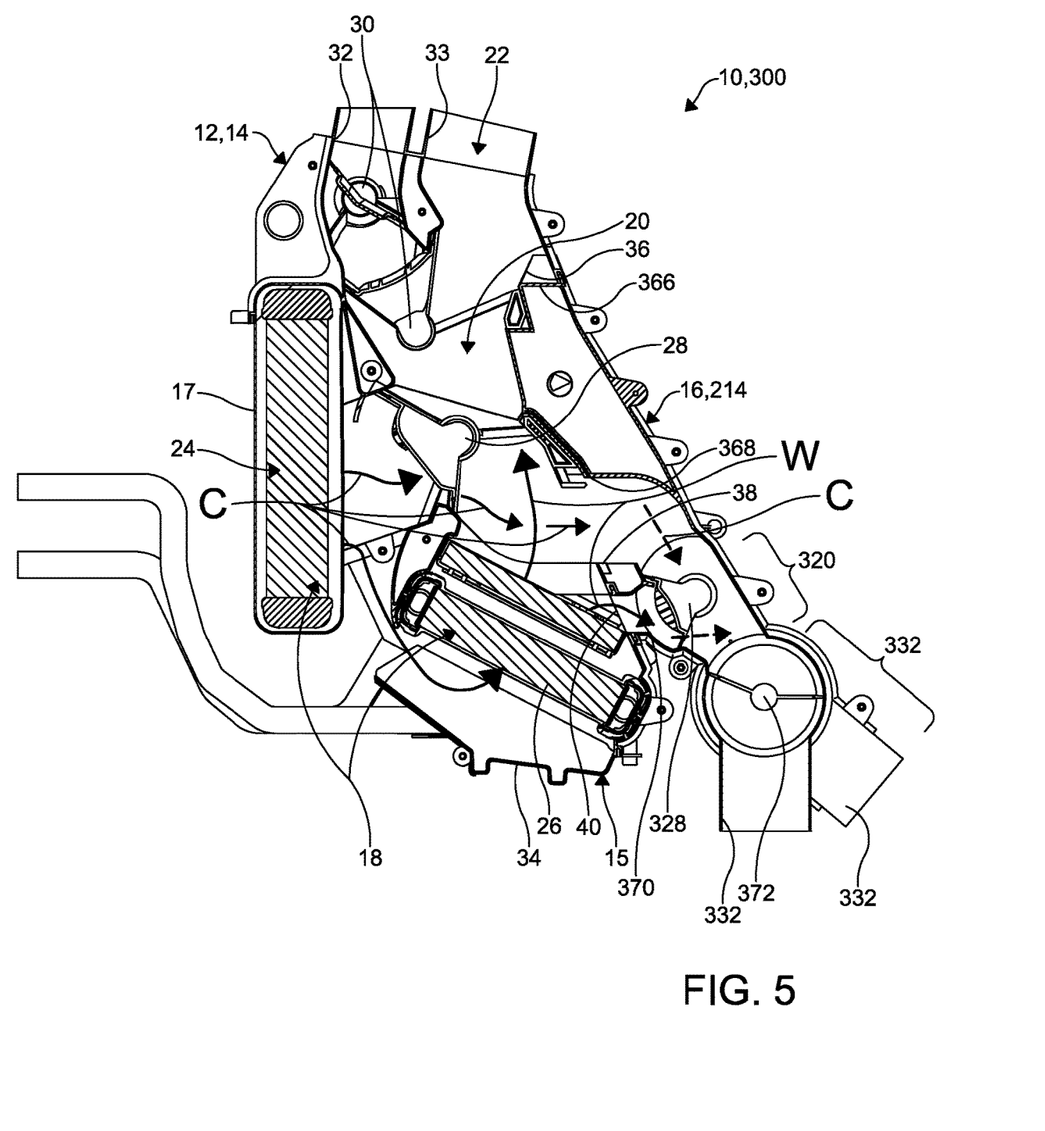
FIG. 5 is a right side elevational cross-sectional view of the air handling system of FIG. 3 taken through a line extending through an interface of a primary housing of the air handling system, wherein the air handling system is in the second configuration.
Figure 6:
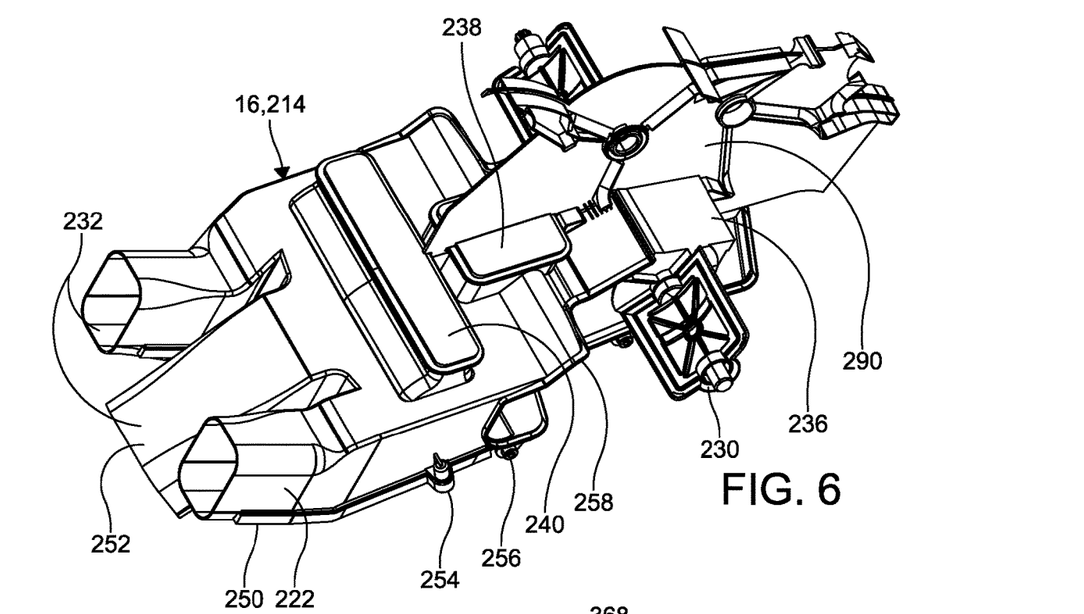
FIG. 6 is a top perspective view of a secondary portion of the air handling system of FIGS. 2 and 4, wherein an interchangeable first plenum is shown.
Figure 7:
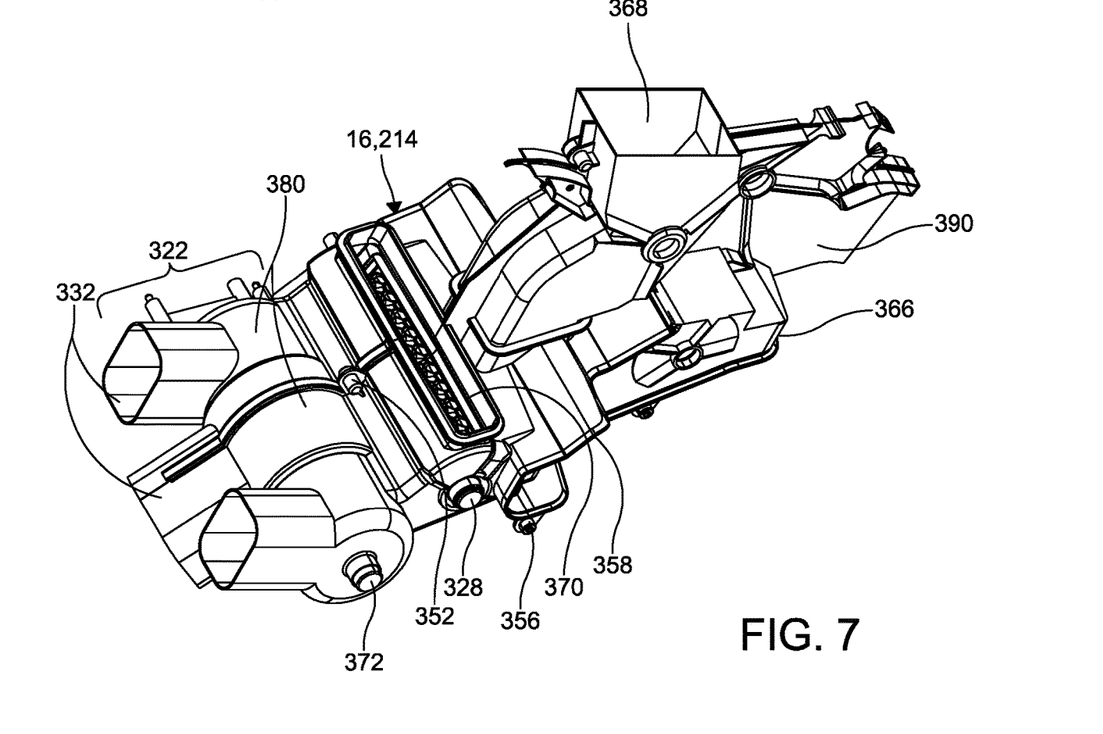
FIG. 7 is a top perspective view of a secondary portion of the air handling system of FIGS. 3 and 5, wherein an interchangeable second plenum is shown.
Figure 8:
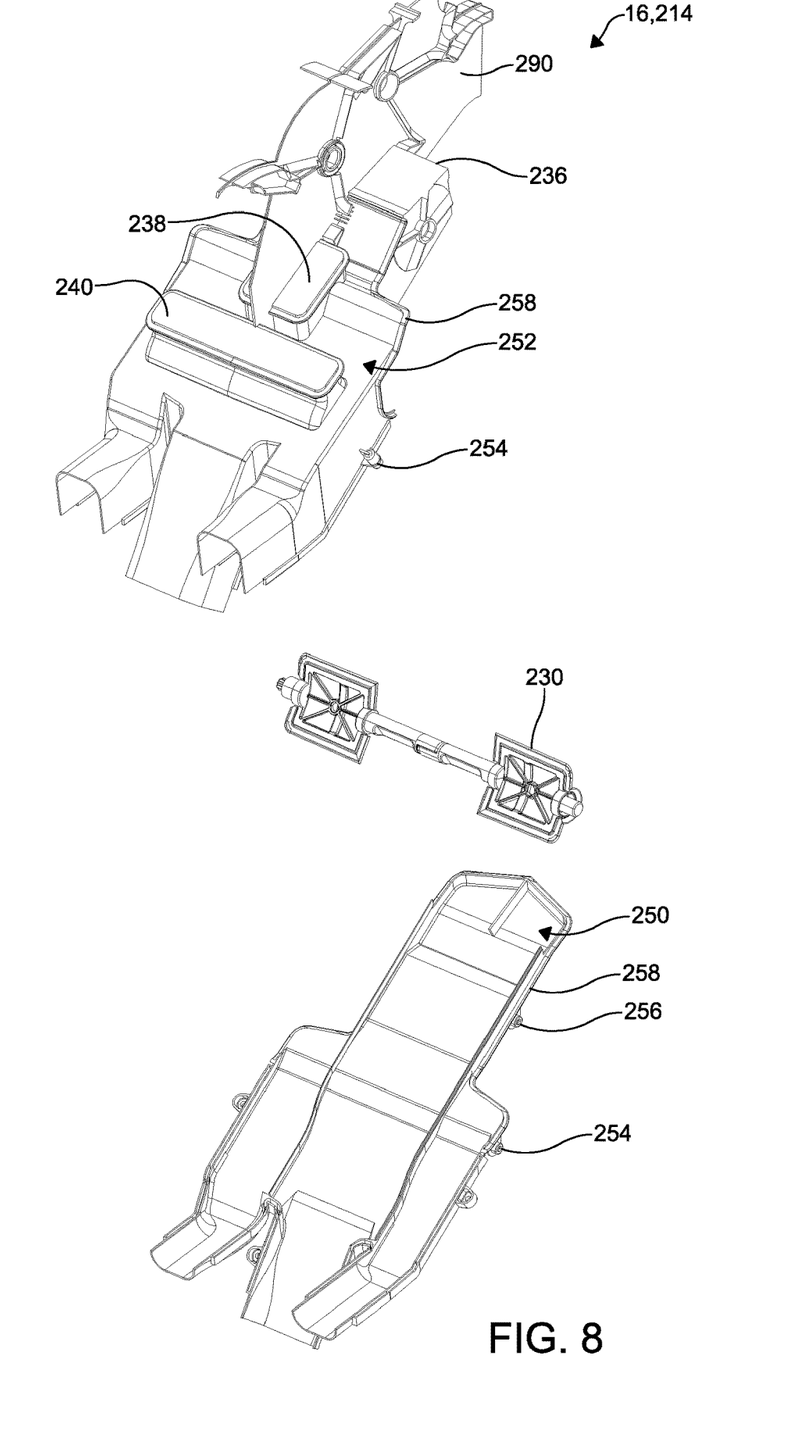
FIG. 8 is an exploded top perspective view of the first plenum of FIG. 6.
Figure 9:
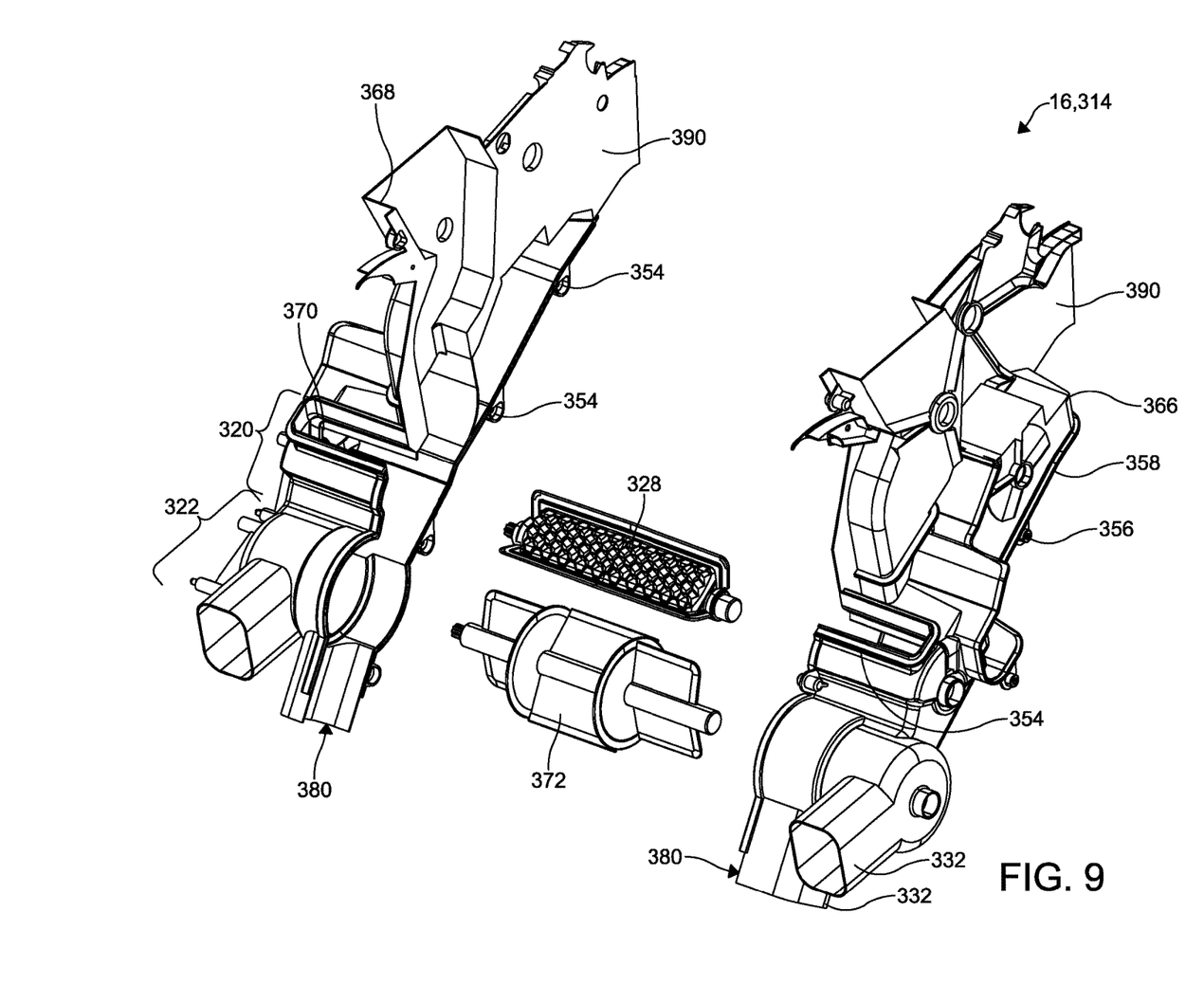
FIG. 9 is an exploded top perspective view of the second plenum of FIG. 7.
Figure 10:
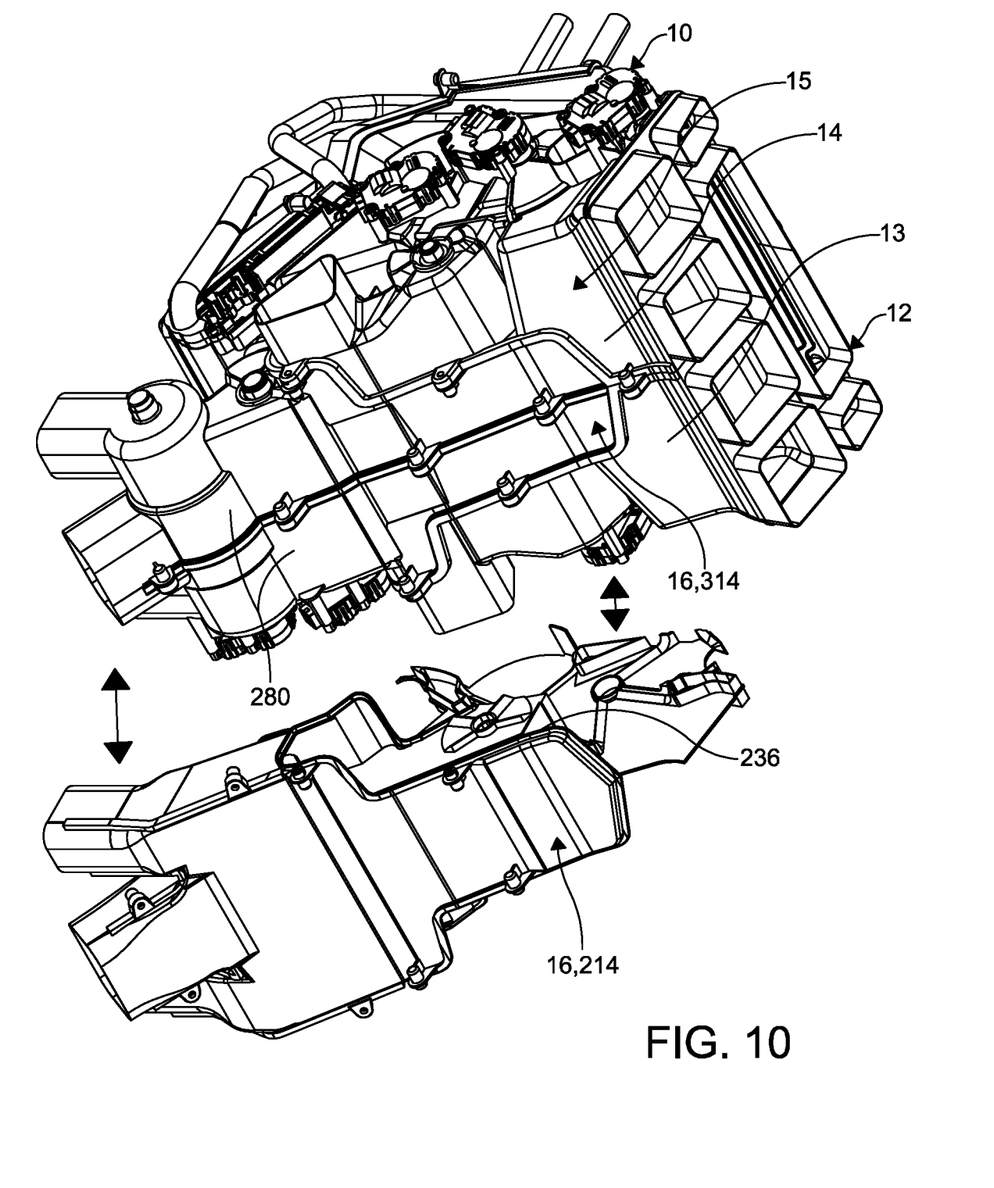
FIG. 10 is a bottom perspective view of the air handling system of FIGS. 3 and 5 in the second configuration, wherein an interchangeability of the first plenum and the second plenum of FIGS. 6-9 is schematically illustrated.
Figure 11:
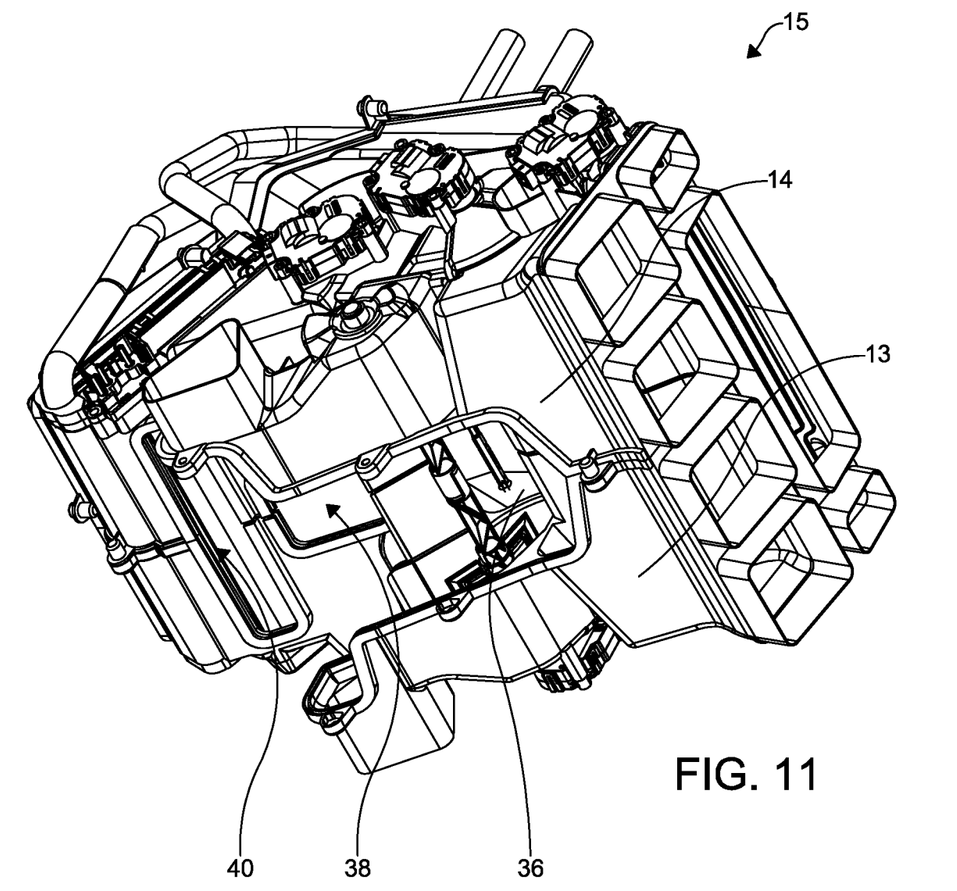
FIG. 11 is a bottom perspective view of a primary housing of the air handling system of FIGS. 2-3.

In some embodiments of the invention, the main housing 12 and thus the primary flow path may be divided laterally by a centrally disposed dividing plate (shown as 290, 390 in FIGS. 6-9, for example) beginning at a position immediately downstream of the evaporator core 24. The flow to each side of the dividing plate may be associated with flow to one of the driver side or the passenger side of the front seat zone 5 or the rear seat zone 6 of the vehicle 100. The use of the dividing plate accordingly allows for the dual zone, tri zone, and quad zone control mentioned previously as the temperature control door 28 and the mode control doors 30 discussed above may be provided and controlled independently to each side of the dividing plate for varying the flow characteristics to either side of the passenger compartment 11. The dividing plate may extend parallel or aligned with a plane extending through an interface 34 of the housing. FIGS. 4-5 illustrate only one side of the dividing plate at a time, but it should be understood that essentially the same flow configuration is provided to either side of the dividing plate.

The primary housing 15 may be formed by the cooperation of a first housing shell 13 and a second housing shell 14. The first and second housing shells 13, 14 engage at the interface 34 with each other along peripheral regions thereof to form the oppositely arranged lateral side walls and portions of the peripherally extending side walls of the main housing 12. The peripheral regions of the first and second housing shells 13, 14 may abut each other along substantially the same dividing plane about a periphery of each of the first and second housing shells. As previously mentioned, the previously mentioned dividing plate may be disposed along the dividing plane formed by the interface 34 of the two housing shells 13, 14.

In the embodiment illustrated, the delivery section 22 of the primary portion 15 of the main housing 12 includes the conduits 32, 33 configured for conveying the air from the mixing section 20 to the front seat zone 5 of the vehicle 100. The mode control doors 30 control the flow of the air through the desired ones of the conduits 32, 33. Where uniform or dependent temperature and flow control of the air is desired between the front driver zone 1 and the front passenger zone 2 of the front seat zone 5 of the vehicle, then the temperature control door 28 and the mode doors 32, 33 move and align simultaneously or uniformly with respect to each of the housing shells 13, 14. For example, portions of the temperature control door 28 and the mode control doors 30 disposed in the first housing shell 13 simultaneous permits or prevents the same amount of air from flowing thereabout as portions of the temperature control door 28 and the mode control doors 30 disposed in the second housing shell 12. To achieve the uniform or dependent control, the control doors 28, 30 within each housing shell 13, 14 are controlled by a common actuating device such as a common shaft caused to rotate by an actuator. Although it is understood, any one of the doors 28, 30 can be sliding doors or other types of doors as desired.

Where independent temperature and flow control of the air is desired between the front driver zone 1 and the front passenger zone 2 of the front seat zone 5 of the vehicle 10, then the temperature control door 28 and the mode doors 32, 33 move and align independently with respect to each of the housing shells 13, 14. For example, the portions of the doors 28, 30 disposed in the first housing shell 13 rotate about a shaft separate from a shaft of the portion of the doors 28, 30 disposed in the second housing shell 14. As a result, separate actuating devices are desired to rotate each half of the doors 28, 30 independently from each other. It is understood, any one of the doors 28, 30 can have portions thereof linearly moving independent of the remaining ones of the portions as desired.

The delivery section 22 also includes a first secondary flow path outlet 36, a second secondary flow path outlet 38, and a third secondary flow path outlet 40. The first secondary flow path outlet 36 is disposed downstream from the temperature control door 28 and the mixing section 20 and adjacent the conduits 32, 33 conveying the air to the front seat zone 5. The first secondary flow path outlet 36 is configured to convey the air after flowing through the mixing section 20 from the primary portion 15 of the main housing 12. The first secondary flow path outlet 36 receives the air at the same temperature as the air flowing from the mixing section 20 and thus the temperature of the air flowing through the conduits 32, 33 to the front seat zone 5 of the passenger compartment 11.

The second secondary flow path outlet 38 is disposed intermediate the first secondary flow path outlet 36 and the third secondary flow path outlet 40. The second secondary flow path outlet 38 is upstream from the mixing section 20. As shown in the illustrated embodiment, the second secondary flow path outlet 38 aligns with the evaporator core 24, wherein the second secondary flow outlet 38 faces the evaporator core 24 such that the direction of the cold flow of air from the evaporator core 24 to the second secondary flow outlet 38 is substantially linear and direct between the evaporator core 24 and the second secondary flow outlet 38. The second secondary flow outlet 38 is configured to receive the cold air flow C.

The third secondary flow path outlet 40 is disposed beneath the second secondary flow path outlet 38 and is directly downstream of the heater core 26 with respect to the direction of the warm air flow W. The third secondary flow path outlet 40 is adjacent the heater core 26 to directly receive the warm air flow W before flowing beyond the third secondary flow path outlet 40. It is understood, the structural arrangement of the secondary flow path outlets 36, 38, 40 can be alternately disposed as desired. However, it is advantageous for the arrangement to be disposed so the first secondary flow outlet 36 receives a desired amount and temperature from the mixing section 20, the second secondary flow outlet 38 receives a desired amount and temperature of the cold air flow C and the third secondary flow outlet 40 receives a desired amount and temperature of the warm air flow W to accommodate the requirements of the air handling system 11 providing air to the rear seat zone 6. The arrangement also advantageously minimizes noise, vibration, and harshness and maximizes efficiency of the flow of the air through the air handling system 10.

The secondary portion 16 of the main housing 12 is modular and interchangeable between various secondary portions. As used herein, the various portions will be designated and illustrated as a first plenum 214 and a second plenum 314 each configured for forming the secondary portion 16 of the air handling system 10. Each of the first plenum 214 and the second plenum 314 are removeably coupled to the primary portion 15 of the main housing 12. However, it is understood more than two secondary portions (plenums) can be employed as interchangeable ones of the secondary portion 16, if desired, depending on the application of the air handling system 10, wherein more than two plenums are capable of being removeably coupled to the primary portion 15. In the illustrated embodiment, the first plenum 214 is coupled to the primary portion 15 to form the first configuration 200 of the air handling system 10. The second plenum 314 is coupled to the primary portion 15 to form the second configuration 300 of the air handling system 10. However, where more than two plenums are interchangeable, each plenum forms a separate configuration.

When the first plenum 214 is coupled to the primary portion 15, the secondary portion 16 of the main housing 12 and the secondary flow path in the first configuration 200 is formed. The first plenum 214 includes a secondary flow path inlet 236, a first sealing portion 238, a second sealing portion 240, a delivery section 222 including a plurality of conduits 232, and a mode control door 230.

In the embodiment illustrated, the first plenum 214 is formed from a plate 250 cooperating with an enclosure 252 to form the secondary flow path. The plate 250 is coupled to the enclosure 252 by a plurality of coupling means 254 such as bolts. However, the plate 250 and the enclosure 252 can be coupled to each other by other means such as a tongue and groove system, pins, welding or soldering, screws, or any other coupling means as desired. Additionally, the first plenum 214 can be unitarily monolithically formed or can be formed by two or more components as desired. The first plenum 214 is coupled to the primary portion 15 of the main housing 12 by coupling means 256 such as bolts. The first plenum 214 includes a lip 258 formed thereon for engaging a groove 58 formed on the primary portion 15 of the main housing 12. As illustrated the lip 258 is formed adjacent the secondary flow path inlet 236. However, the lip 258 can be formed at any portion of the first plenum 214 as desired. The lip 258 cooperates with the groove 58 so the first plenum 214 can slidingly engage the primary portion 15 of the main housing 12. Once the first plenum 214 slidingly engages the primary portion 15 of the main housing 12, the coupling means 256 further secure the first plenum 214 to the primary housing 215. It is understood, other coupling or engaging features can be employed together with or separate from lip 258 and the groove 58 and the coupling means 256 as desired.

When the first plenum 214 is coupled to the primary portion 15 of the main housing 12, the secondary flow path inlet 236 is aligned and in fluid communication with the first secondary flow path outlet 36. The first sealing portion 238 is aligned in non-fluid communication with the second secondary flow path outlet 38, wherein the first sealing portion 238 stops or prevents air from passing beyond the second secondary flow path outlet 38. The second sealing portion 240 is aligned in non-fluid communication with the third secondary flow path outlet 40, wherein the second sealing portion 240 stops or prevents air from passing beyond the third secondary flow path outlet 40.

The mode control door 230 is disposed downstream from the secondary flow path inlet 236 to open or close the secondary flow path. When the mode control door 230 opens the secondary flow path, the air flowing through the mixing section 20 of then flows through the secondary portion 16 of the main housing 12, through the conduits 232, to the rear seat zone 6 of the passenger compartment 11. As a result, a temperature of air flowing through the secondary flow path is dependent on the temperature of the air flowing through the mixing section 20 of the primary portion 15 of the main housing 12.

The second plenum 314 is similar to the first plenum 214. Components of the second plenum 314 that are similar to the first plenum 214 are designated with similar references numerals but with a leading "3" instead of "2." When the second plenum 314 is coupled to the primary portion 15, the secondary portion 16 of the main housing 12 and the secondary flow path in the second configuration 300 is formed. The second plenum 314 includes a sealing portion 366, a first secondary flow path inlet 368, a second secondary flow path inlet 370, a delivery section 322 including a plurality of conduits 332, and a secondary mode door 372. The second plenum 314 further includes a secondary mixing section 320 and a secondary temperature control door 328.

As shown, the second plenum 314 is formed by the interior and abutting portions of housing shells 380. However, the second plenum 314 may be formed unitarily or monolithically. Alternatively, the second plenum 314 can be formed by more than two components. For example, the conduits 332, the secondary delivery section 322, the secondary mixing section 320, and remaining portions of the second plenum 314 can be formed from separate components, if desired. The housing shells 380 are coupled together by coupling means such as bolts 354. However, it is understood other coupling means can be employed to couple the housing shells 380 together such as a tongue and groove system, pins, welding or soldering, screws, or any other coupling means as desired. The second plenum 314 is coupled to the primary portion 15 of the main housing 12 by coupling means 356 such as bolts. The second plenum 314 includes a lip 358 formed thereon for engaging the groove 58 formed on the primary portion 15 of the main housing 12. As illustrated, the lip 358 is formed adjacent the sealing portion 366. However, the lip 358 can be formed at any portion of the second plenum 316 as desired. The lip 358 cooperates with the groove 58 so the second plenum 314 can slidingly engage the primary portion 15 of the main housing 12. Once the second plenum 314 slidingly engages the primary portion 15 of the main housing 12, the coupling means 356 further secure the first plenum 314 to the primary portion 15. It is understood, other coupling or engaging features can be employed together with or separate from lip 358 and the groove 58 and the coupling means 356 as desired.

When the second plenum 314 is coupled to the primary portion 15 of the main housing 12, the sealing portion 366 is aligned and in non-fluid communication with the first secondary flow path outlet 36, wherein the sealing portion 366 stops or prevents air from passing beyond the first secondary flow path outlet 36. The first secondary flow path inlet 368 is configured as a cold air inlet and is aligned and in fluid communication with the second secondary flow path outlet 38 to convey the cold air flow C into the second plenum 314. The second secondary flow path inlet 370 is configured as a warm air inlet and is aligned and in fluid communication with the third secondary flow path outlet 40 to convey the warm air flow W into the second plenum.

As a result, the air exiting the evaporator core 24 may be divided to flow through an interior of the second plenum 314 along the secondary flow path or around an exterior of the second plenum 314 along the primary flow path and towards the mixing section 20. The air exiting the heater core 26 may be divided to flow through the second plenum 314 along the secondary flow path or past the second plenum 314 and towards the mixing section 20 of the primary flow path.

The secondary mixing section 320 includes the secondary temperature control door 328 rotatably disposed therein that is adjustable between a first position blocking flow through the first secondary flow path inlet 368 while allowing flow through the second secondary flow path inlet 370 and a second position allowing flow through the first secondary flow path inlet 368 while blocking flow through the second secondary flow path inlet 370. The secondary temperature control door 328 is also adjustable to a plurality of intermediate positions for controlling the distribution of the air between the first secondary flow path inlet 368 and second secondary flow path inlet 370. The cold air flow C through the first secondary flow path inlet 368 and the warm air flow W through the second secondary flow path inlet 370 are mixed within the secondary mixing section 320 immediately after passing by the associated portion of the secondary temperature control door 328.

The secondary delivery section 322 is disposed immediately downstream of the secondary mixing section 320 and includes the secondary mode door 372 rotatably disposed therein. A first one of the conduits 332 and a second one of the conduits 332 branch from the secondary delivery section 322. The first one of the delivery conduits 332 may lead to a floor of the rear seat zone 6 of the vehicle 100 while the second one of the delivery conduits 332 may lead to a consoled region of the rear seat zone 6 of the vehicle 100, as desired. The secondary mode door 372 is adjustable between a first position directing flow through the first ones of the conduits 332 while preventing flow through the second one of the conduits 322 and a second position directing flow through the second one delivery conduits 322 while preventing flow through the first one of the conduits 322. The secondary mode door 372 is also adjustable to a plurality of intermediate positions for controlling the distribution of the air between the first one of the conduit 322 and the second one of the conduits 322.

In the illustrated embodiment, the secondary temperature control door 328 rotates about a single shaft by a single actuator where tri zone control is desired. As a result, the rear seat zone 6 of the passenger compartment 11 is independently temperature controlled from the front seat zone 5 of the passenger compartment 11, but the rear driver zone 3 and the rear passenger zone 4 are not independently temperature controlled. However, wherein the quad zone control is desired, the temperature control door 328 is divided such that a first portion of the temperature control door 328 and a second portion of the temperature control door 328 rotate about separate but axially aligned shafts. Each shaft is actuated by a separate actuator. As a result, the driver rear seat zone 3 and the passenger rear seat zone 4 can be independently controlled.

For each of the plenums 214, 314, the secondary flow path is formed along a central portion of the primary housing 15 with respect to the lateral direction of the primary housing 15 wherein at least a portion of the primary flow path passes to either lateral side of the secondary flow path. The plenums 214, 314 each include the primary housing dividing plate 290, 390. The dividing plates 290, 390 divide portions of the primary housing 15 along the central portion of the primary housing 15. The dividing plates 290, 390 are configured for positioning the temperature control door 28 and mode control doors 30 of the primary housing 15. It is understood, the dividing plates 290, 390 can be formed separate from the respective ones of the plenums 214, 314, if desired.

The components forming the secondary flow path may further include a central dividing plate in similar fashion to the primary flow path for segregating the secondary flow path into left and right sides (driver side and passenger side). The separated sides may be independently controlled in order to achieve the aforementioned quad zone control contemplated by the present invention and as described herein above.

In use, the air handling system 10 draws air in through the inlet section 17 where the air is divided into the primary flow path and the secondary flow path based on the air flowing interior to or exterior to the secondary portion 16. For the primary flow path, the air flows through the evaporator core 24 to form the cold air flow C. The air flows through the heater core 26 to form the warm air flow W. The temperature control door 28 controls the amount of the cold air flow C and the warm air flow W flowing to the mixing section 28, wherein the cold air flow C and the warm air flow W are combined and mixed. The mixed air is then conveyed to the front seat zone 5 of the passenger compartment 11, wherein the temperature of the air between the front driver zone 1 and the front passenger zone 2 is substantially the same when the temperature control door 28 is not divided into two and can be controlled independently from each other when the temperature control door 28 is divided into two separately controlled components.

When the first plenum 214 is coupled to the primary portion 15 to form the first configuration 200, the air mixed in the mixing section 20 can be conveyed through the secondary flow path to the rear seat zone 6 of the passenger compartment 11. The mode control door 230 controls an amount of the air delivered to the rear seat zone 6. As a result, a temperature of the air delivered to the rear seat zone 6 is substantially the same as the temperature of the air from the mixing section 20.

When a tri zone or quad zone control of the passenger compartment 11 is desired, the second plenum 314 is coupled to the primary housing 15 to form the second configuration 300. In the second configuration 300, the secondary flow path receives the air from the cold air flow C through the first secondary flow path inlet 368 and the air from the warm air flow W through the second secondary flow path inlet 370. The secondary temperature control door 328 controls the amount of the warm air flow W and the cold air flow C entering the secondary mixing section 320 to be combined and mixed. The air from the secondary mixing section 320 is then conveyed to the rear seat zone 6. The air delivered through the respective ones of the conduits 332 is controlled by the secondary mode door 372. As a result, the temperature to the rear seat zone 6 can be independently temperature controlled from the temperature of the air delivered to the front seat zone 5. Where it is desired to independently control the air delivered to each of the rear driver zone 3 and the rear passenger zone 4, the secondary temperature control door 328 is divided into two components, wherein each component is independently controlled per shell 380 of the second plenum 314.

It is understood, the air handling system 10 may also be adjustable to any possible configuration of any of the disclosed doors in addition to those shown and described herein for achieving any of a variety of different operational modes of the air handling system 10.

The disclosed air handling system 10 accordingly allows for the independent temperature control of at least two spaced apart zones of the passenger compartment without requiring the use of additional heating or cooling devices or structures. The interchangeable plenums 214, 314 allow the air handling system 10 to be easily configured for single/dual configurations or tri/quad configurations without having to expand packaging size.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system of a vehicle comprising:
a main housing interchangeable between a first configuration and a second configuration, the main housing further comprising:
a primary portion configured to convey a cold air flow and a warm air flow therethrough; and
a secondary portion interchangeable between a first plenum in the first configuration of the main housing and a second plenum in the second configuration of the main housing, wherein a temperature of air flowing through the secondary portion of the main housing in the first configuration is dependent on air flowing in a mixing section of the primary portion, and the temperature of the air flowing through the secondary portion of the main housing in the second configuration is dependent on air flowing through a secondary mixing section of the secondary portion.

2. The air handling system of claim 1, wherein the first plenum and the second plenum are configured to be removeably coupled to the primary portion.

3. The air handling system of claim 1, wherein the mixing section combines the warm air flow and the cold air flow, and wherein the main housing in the first configuration conveys air from the mixing section to the secondary portion.

4. The air handling system of claim 1, wherein the main housing in the second configuration conveys the cold air flow and the warm air flow directly to the secondary portion.

5. The air handling system of claim 1, wherein the first plenum includes a mode control door and a delivery section having a plurality of conduits.

6. The air handling system of claim 1, wherein the second plenum includes at least one temperature control door.

7. The air handling system of claim 6, wherein the at least one temperature control door includes a pair of independently controlled doors.

8. The air handling system of claim 1, wherein the main housing in the first configuration is configured for independently controlling an amount and a temperature of air to at least two zones of a passenger compartment of the vehicle.

9. The air handling system of claim 8, wherein the main housing in the second configuration is configured for independently controlling an amount and a temperature of air to at least three zones of a passenger compartment of the vehicle.

10. An air handling system of a vehicle comprising:
a main housing interchangeable between a first configuration and a second configuration, the main housing further comprising:
a primary portion configured to convey a cold air flow and a warm air flow therethrough, and
a secondary portion interchangeable between a first plenum in the first configuration of the main housing and a second plenum in the second configuration of the main housing, wherein the primary portion includes a first secondary flow path outlet disposed downstream of a mixing section of the primary portion, a second secondary flow path outlet disposed upstream of the mixing section of the primary portion for receiving the cold air flow, and a third secondary flow path outlet for receiving the warm air flow.

11. The air handling system of claim 10, wherein the first plenum includes a secondary flow path inlet in fluid communication with the first secondary flow path outlet, a first sealing portion aligning with the second secondary flow path outlet, and a second sealing portion aligning with the third secondary flow path outlet.

12. The air handling system of claim 10, wherein the second plenum includes a sealing portion aligning with the first secondary flow path outlet, a first secondary flow path inlet in fluid communication with the second secondary flow path outlet, and a second secondary flow path inlet in fluid communication with the third secondary flow path outlet.

13. An air handling system of a vehicle comprising:
a primary portion of a main housing configured to convey a cold air flow and a warm air flow therethrough, the primary portion including a mixing section and a temperature control door controlling an amount of the cold air flow and an amount of the warm air flow conveyed to the mixing section;
a first plenum removeably coupled to the primary portion of the main housing, the first plenum configured to receive air from the mixing section of the primary portion of the main housing; and
a second plenum interchangeable with the first plenum for coupling to the primary portion of the main housing, the second plenum configured for directly receiving the cold air flow and the warm air flow upstream from the mixing section of the primary portion of the main housing.

14. The air handling system of claim 13, wherein the second plenum includes a secondary mixing section and a secondary temperature control door for controlling an amount of the cold air flow and an amount of the warm air flow into the secondary mixing section.

15. The air handling system of claim 13, wherein the primary portion controls a temperature of air from the mixing section to a front seat zone of a passenger compartment of the vehicle and the first plenum is configured to convey the air from the mixing section at substantially a same temperature to a rear seat zone of the passenger compartment of the vehicle.

16. The air handling system of claim 13, wherein the primary housing controls a temperature of air from the mixing section to a front seat zone of a passenger compartment of the vehicle and the second plenum is configured to deliver air to a rear seat zone of the passenger compartment of the vehicle at a different temperature from the front seat zone of the passenger compartment of the vehicle.

17. The air handling system of claim 13, wherein the first plenum and the second plenum are coupled to the primary portion of the main housing with a tongue and groove system.

18. A vehicle with an air handling system, the vehicle comprising:
a front seat zone of a passenger compartment of the vehicle, the front seat zone divided into a front driver zone and a front passenger zone;
a rear seat zone of the passenger compartment of the vehicle, the rear seat zone divided into a rear driver zone and a rear passenger zone; and
a main housing of the air handling system configured to deliver air to the front seat zone and the rear seat zone of the passenger compartment, a portion of the main housing removeably interchangeable between a first configuration and a second configuration, wherein a temperature of the air delivered to the rear seat zone is dependent on a temperature of the air delivered to the front seat zone when the main housing is in the first configuration, and wherein the temperature of the air delivered to the rear seat zone is independently controlled from the temperature of the air delivered to the front seat zone when the main housing is in the second configuration.

19. The vehicle of claim 18, wherein a temperature of the air delivered to the front driver zone and a temperature of the air delivered to the front passenger zone are independently controlled in the first configuration of the main housing and the second configuration of the main housing, and wherein a temperature of the air delivered to the rear driver zone and a temperature of the air delivered to the rear passenger zone are independently controlled from each other in the second configuration of the main housing.

* * * * *